(12) United States Patent
Carrier et al.

(10) Patent No.: US 12,361,710 B2
(45) Date of Patent: Jul. 15, 2025

(54) SYSTEM FOR REMIXABLE VIDEO CONTENT AND PER-FRAME METADATA CAPTURE AND PLAYBACK

(71) Applicant: Pinata Farms, Inc., Los Angeles, CA (US)

(72) Inventors: Colin Carrier, Los Angeles, CA (US); Carlos Adame, Santa Monica, CA (US); Lukas Schulte, Los Angeles, CA (US); Orest Kupyn, Lviv (UA); Asaad Hakeem, Dublin, CA (US)

(73) Assignee: Pinata Farms, Inc., Los Angeles, CA (US)

( * ) Notice: Subject to any disclaimer, the term of this patent is extended or adjusted under 35 U.S.C. 154(b) by 369 days.

(21) Appl. No.: 17/535,315

(22) Filed: Nov. 24, 2021

(65) Prior Publication Data
US 2022/0165061 A1    May 26, 2022

Related U.S. Application Data

(60) Provisional application No. 63/117,890, filed on Nov. 24, 2020.

(51) Int. Cl.
*G06V 20/40* (2022.01)
*G06T 7/73* (2017.01)
*G06V 40/20* (2022.01)

(52) U.S. Cl.
CPC .............. *G06V 20/46* (2022.01); *G06T 7/73* (2017.01); *G06V 20/44* (2022.01); *G06V 40/23* (2022.01); *G06T 2207/10016* (2013.01); *G06T 2207/30196* (2013.01)

(58) Field of Classification Search
CPC ........ G06V 20/46; G06V 20/44; G06V 40/23; G06V 10/25; G06V 10/62; G06T 7/73; G06T 2207/10016; G06T 2207/30196; G11B 27/28; G11B 27/32; G11B 27/031
See application file for complete search history.

(56) References Cited

U.S. PATENT DOCUMENTS

| | | | |
|---|---|---|---|
| 2011/0187703 A1* | 8/2011 | Patwardhan | G06T 7/251 348/169 |
| 2012/0233648 A1* | 9/2012 | Raman | H04N 21/4622 725/93 |
| 2014/0280755 A1* | 9/2014 | Memon | H04L 67/75 709/219 |
| 2016/0065900 A1* | 3/2016 | Liu | G06F 16/745 348/155 |

(Continued)

*Primary Examiner* — Amara Abdi
(74) *Attorney, Agent, or Firm* — Hickman Becker Bingham Ledesma LLP

(57) ABSTRACT

Metadata is generated for a digital video project in a manner that facilitates mixing video with other content to render a composite video file. The metadata may include global information for the project, per-frame information that acts as a representation of continuous values throughout a video; and key-frame information which is a representation of discrete events throughout the video. The per-frame information may include, for example, point-wise location of specific objects and/or polygons/rectangles of tracked objects. The key-frame information may include information regarding scene changes, information regarding changes in emotion of a person and/or information regarding changes in pose of a person.

18 Claims, 8 Drawing Sheets

(56) References Cited

U.S. PATENT DOCUMENTS

2017/0228137 A1* 8/2017 Carlos .................... G06F 3/0488
2017/0270970 A1* 9/2017 Ho ......................... G06F 16/583
2018/0098034 A1* 4/2018 Altuev ................... H04N 7/181

* cited by examiner

```
{
    #GLOBAL PROPERTIES
    "id": <String>              # UUID (RFC 4122)
    "videoLocation": <String>   # Location of mp4
    "numObjects": <Int>         # number of objects
    "thumbnailLocation": <String>  # Location of image thumbnail
    #KEYFRAME PARAMETERS
    "sceneChanges": <[Int]>     # Frames where scene changes
    #FRAME-WISE PARAMETERS
    "frames": <[frame]>         # JSON Description of framewise info
```

Fig. 3

```
{
    "sceneChanges": [1],
    "objectsTypes": [
        {"objectId": 1, "type": "head"},
        {"objectId": 3, "type": "head"}],
    "frames": [{
            "frameNumber": 0,
            "objects": [{
                    "objectId": 1,
                    "type": "head",
            "position": {"X": 50, "Y": 50, "W": 100, "H": 100},
            "emotion": "happy",
            "center": {"X": 50, "Y": 50},
            "RPY": {"R": 30, "P": 30, "Y": 30}
                },
                {
                    "objectId": 3,
                    "type": "head",
            "position": {"X": 400, "Y": 400, "W": 75, "H": 75},
            "emotion": "neutral",
            "RPY": {"R": 30, "P": 30, "Y": 30}
                }
            ]
        },
        {
            "frameNumber": 1,
            "objects": [{
                    "objectId": 1,
                    "type": "head",
            "position": {"X": 55, "Y": 55, "W": 100, "H": 100},
            "emotion": "happy",
            "RPY": {"R": 30, "P": 30, "Y": 30}
                },
                {
                    "objectId": 3,
                    "type": "head",
            "position": {"X": 395, "Y": 395, "W": 80, "H": 80},
            "emotion": "sad",
            "RPY": {"R": 30, "P": 30, "Y": 30}
                }
            ]
        }
    ]
}
```

Fig. 4

SYSTEM FOR REMIXABLE VIDEO CONTENT AND PER-FRAME METADATA CAPTURE AND PLAYBACK

CROSS-REFERENCE TO RELATED APPLICATIONS; BENEFIT CLAIM

This application claims the benefit of Provisional Application 63/117,890, filed Nov. 24, 2020, the entire contents of which is hereby incorporated by reference as if fully set forth herein, under 35 U.S.C. § 119(e).

FIELD OF THE INVENTION

The present invention relates to digital video and, more specifically, to techniques for creating remixable video content and per-frame metadata capture and playback of digital video.

BACKGROUND

Various toolsets are available for creating and manipulating digital video. Conventionally, video editors have integrated project-file management, which simplifies video capture and manipulation for most uses, but is not ideal for video content that will be used for remixing with other video.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is an example of types of metadata that may be associated with a video, according to an implementation;

FIG. 4 is an example of metadata for tracking heads in a video, according to an implementation;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview: A System for Independent Metadata Capture & Rendered Playback in Video A system is described hereafter for a video toolset separating the metadata capture (typically known as the project file) from the rendering components (adding assets/effect and saving the video out to a file).

Significantly, the system splits the video editor (creative toolset) from the project-file (metadata toolset). All existing similar systems/products combine the two. The two parts of content creation tools are:

The Project Metadata—The metadata description of what to render. This can be generic information such as the project title, framerate, resolution, location of assets, layers, etc.

The Renderer—The element of the creative tool that combines the metadata, media, and/or graphical effects information into a viewable video stream. This is typically known as the 'video editor'

A video is a continuous 2D series of images that can be broken down into constituent frames. Traditional video editors create corresponding frame-accurate metadata and perform modifications and transformations on this video. These modifications are stored in a project file. The renderer loads the video, metadata, and renders media, effects, or animations. Once a creator is satisfied they export the project to a new video file. In the system described here, the metadata creation process and video editor are two separate toolsets. The system is comprised of the following core components The data generator which ingests the original video file and generates a metadata file describing that video. This tool allows for both automated and manual annotation of the video. It allows a user to specify where objects are in a video, and other metadata. Critically, it does not export a rendered video file with assets.

The video editor which contains creative tools. Video editor ingests the metadata, and fetches necessary assets. The renderer in this editor creates a composition based on the metadata, assets, and user inputs. Exporting the project involves rendering the composite into a video file.

Figure 1:
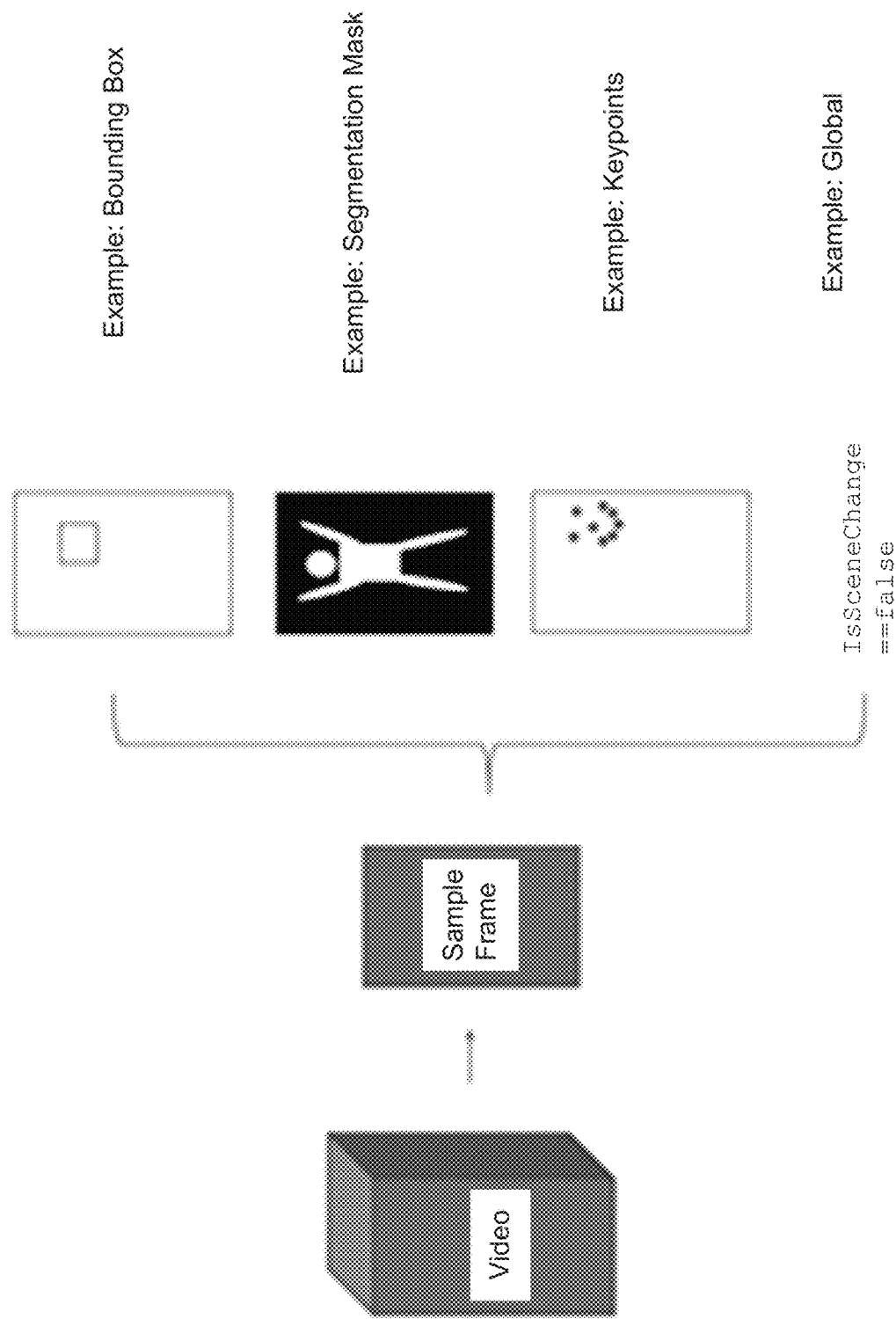
FIG. 1 is a block diagram illustrating various layers of metadata that may be associated with a frame of video, according to an implementation.

The project metadata may include generic information such as a 'pinning' an item to an on-screen location, or adding a blur to the video. It may also include detailed frame-accurate information about positions/objects in the video {FIG. 1: An example video frame with multiple layers of information. In this case a single object with multiple parameters (bounding box, segmentation mask, and keypoints), and a global frame state indicating this frame is not a scene change}

Figure 2:
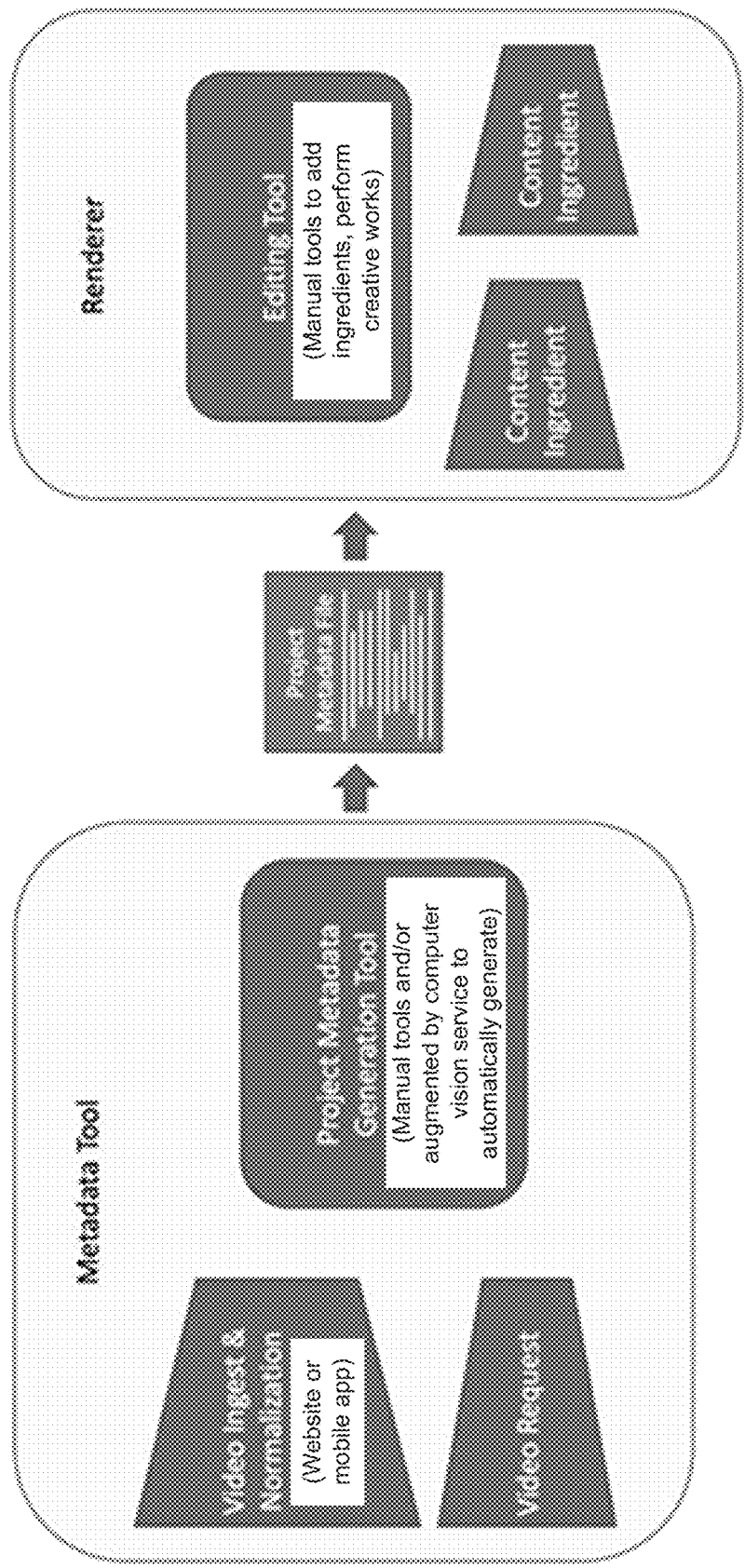
FIG. 2 is a block diagram illustrating how a metadata file generated by a metadata tool may be used by a renderer, according to an implementation.

The project metadata may be generated automatically by processing the video or manually through markup tools. The metadata is saved and stored for use by a creator. See FIG. 2.

An Analogy: Mad-Libs

Mad Libs is a phrasal template word game which consists of a creator adding a list of words to substitute for blanks in a template story.

An example:

The template: "The <u><noun></u> jumped <u><adverb></u> over the <u><noun></u>."

The word ingredients: ["cat", "elegantly", "mouse" ]

The story: "The <u>cat</u> jumped <u>elegantly</u> over the <u>mouse</u>."

In mad-libs the story template is given by a third party, but the details & creative elements are provided by the creators, allowing for an endless combination of components into different storylines. The creative elements can have different parts of speech (noun, adjective, adverb, etc.).

At its simplest form, the system described here is essentially mad-libs for video projects.

The Template Project Metadata: A video project (which may have been created by a third party) that describes the elements, objects, and/or layers in a video.

The Content Ingredients: Images. graphical effects, or sound which the user chooses.

The Rendered Video: The fully rendered video (file exportable) of the project metadata and content ingredients.

Similar to mad libs, the large variety and possibility of the content-ingredients allows for creativity and diversity in the final output. Additionally, similar to madlibs might be composed of inputs on one or more parts of speech, the project file here might describe different types of creative elements to use.

Similar Systems

Existing systems fall into two primary categories.

Real time video effects such Snapchat lenses, IG face filters, various AR applications, etc. These use a live camera feed, extract per-frame metadata, and display to feed.

They do not have the ability to look at frames in the future and extract information They do not store the generated metadata for later use Video editors such cinema4D, iMovie, etc.

They are content creation tools—not metadata generation tools

The project files are not cloud-hosted (and therefore not shareable)

All assets are needed to make a piece of content. (in contrast, the tool described herein exists solely to create metadata descriptions.)

Real-time AR-filter technologies (snapchat lenses, IG lenses, Augmented Reality Products) take in a camera stream, process the stream, and use the generated metadata in real-time, on the same device along with responsive effects to generate the video stream seen on device. This video stream is then captured and stored (or shared).

Video editors (either desktop such as cinema4D, or web based such as kapwing) ingest a non-real-time video stream, enable the user to generate project metadata, and ultimately render the video to a file.

Data Representation

The target output of this 'web-tool' is a metadata file that in a compact format describes information in the video, at frame-level granularity if need be.

Metadata is grouped into 3 main categories.

(1) Global information which holds true for a given video 'project'. This includes (but is not limited to) things like:
framerate
resolution
media (video) location
thumbnail location
large metadata location (blob storage)

(2) Per-Frame information which acts as a representation of continuous values throughout a video. This includes (but is not limited to) things like:
Point-wise location of specific objects
Polygons/rectangles of tracked objects (3) Key-frame information which is a representation of discrete events throughout the video. This includes (but is not limited to) things like:
Scene changes
Changes in emotion/pose of a given person The generic representation of this source-video information allows for it to be represented in multiple formats that can be interpreted across various tech-stacks (.json, .proto, .txt). (See FIG. 3)

It is critical that the Project Metadata tool and the Renderer share the same schema for the metadata. Per the analogy above, if the mad-lib calls for an 'adverb' but the client interpreter does not understand what an 'adverb' is, they will not be able to create.

An Example

Provided below are specific examples of key-frame and continuous metadata types. The JSON represents a partial description of metadata for two objects.
Global information is shown in objectsTypes
Key-frame information is listed under sceneChanges
Continuous information is shown in frames Bounding Box Tracking for Heads As part of the system, the design necessarily includes handling the tracking of an item's continuous movement throughout a video. As a proxy for true continuous motion, use frame-wise metadata encoding is used. This allows continuous tracking of scale, position, rotation, and other properties of specific objects. A prominent example of this is with tracking heads. An example 'json' encoding of two frames for two objects is presented. (See FIG. 4)

In the snippet in FIG. 4, information is encoded about an object at every frame. Not every property is required to build this system—these are representative values to provide an illustration.

The frame number to explicitly state which frame is being worked with. Two frames are shown in FIG. 4.

An array of objects present at that frame.

Each object has an ID. This ID can be an integer value, hash, or other. Critically, object IDs are global to each video. They These positioning of these objects are described with bounding boxes under the key 'position'.

They may also contain rotational information (Roll, Pitch, and Yaw) as well as other properties.

Since these are of the 'head' type they may contain information specific to this object type. In this case a listing for 'emotion', but potentially also keypoints, mouth openness, or any other descriptive property.

This example (See FIG. 4) shows a 'frame-first' view of the metadata. The object can equivalently be stored 'object first'. Where the object contains the array for which it is present. This may be preferable in some cases.

Scene Change Embedding

Discrete, infrequent events throughout the duration of a video can be tracked through arrays of certain event types, or an array containing a tuple of <eventType, frameNumber>. This is a more compact way to store information for infrequent changes.

Creative Tools from Metadata

The creative tools contain an interpreter for this strongly typed metadata information. Example interactions with the above metadata could include:

Pinning a sticker of cut out Head image to object with id 1

The sticker will follow the scale, positioning, and rotation contained in the metadata description. The renderer composites the overlay live for the user to see.

A user may add a string of text as a sticker on the video canvas on Frame 1. The 'text' adding tool might have a feature that displays text only during the scene that the text was added. At the next scene change, the text is removed from the canvas. In the example above, at Frame 2 the text would disappear.

A user may add a sticker at a certain offset from a tracked object. As an example, a user might place pin a picture of a crown onto object 3. The crown snaps to the center of the bounding box. The user taps on the sticker of the crown, a touch interaction is registered and the user can drag the crown away from the center of the tracked head. The user shifts the crown 50 pixels up, and 4 to the left, and shrinks the size by 30%. The crown picture now has a transformation from the tracked object that will be respected for the frames that Object 3 is visible.

Content Ingestion & Metadata Generation

For a given piece of video content to build the Project Metadata for, it may be preferable to send it through an initial analysis and potentially a 'normalization' process. The initial analysis constructs the initial Global Properties referenced above. The normalization process might consist of transcoding, resizing, or cropping/trimming/splicing the video to get it into an optimal format for a certain consumption experience (e.g. cropping to a vertical aspect ratio to optimize content for mobile, change resolution/compression characteristics for a certain bandwidth limitation).

Upon ingestion, the video does not need to conform to any particular technical specifications or subject matter. It may be:

From a live camera or pre-recorded

Any resolution, aspect ratio, framerate, or video format

Figure 5:
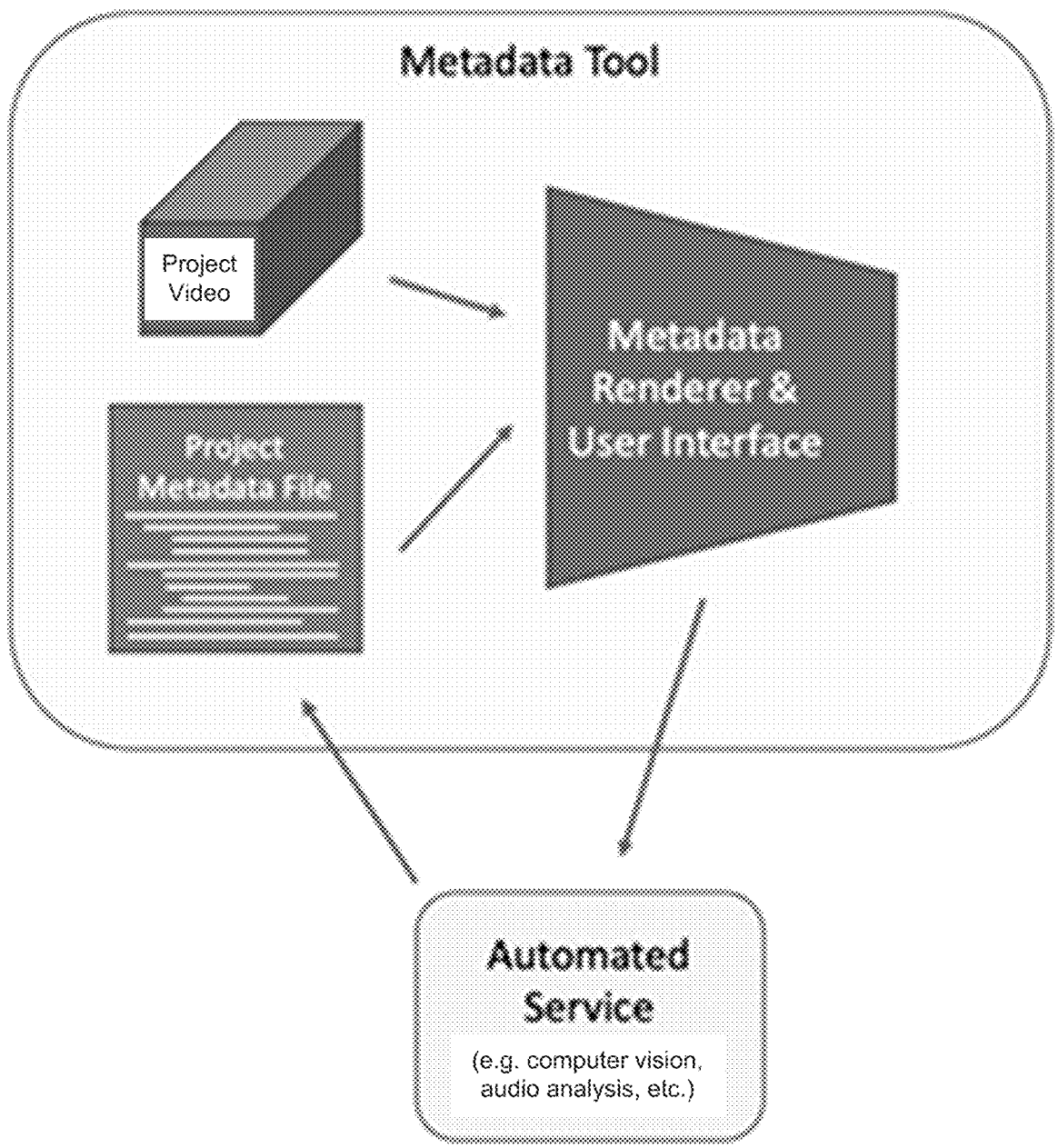
FIG. 5 is a block diagram illustrating how a metadata tool may be implemented in conjunction with an automated service, according to an implementation.

Depictions of the real world, or cartoons, renderings, or clips from video-games After ingestion, a global properties description exists, but what remains is to add additional descriptive layers (per frame or keyframe). These can be added manually, or automatically through a computer-vision or other analysis pipeline. (See FIG. 5)

Video Rendering with Metadata

The rendering engine creates a continuously composition from

The Project Metadata file

Content ingredients such as images or other video

User inputs for selecting ingredients from a library to match with the metadata.

Figure 6:
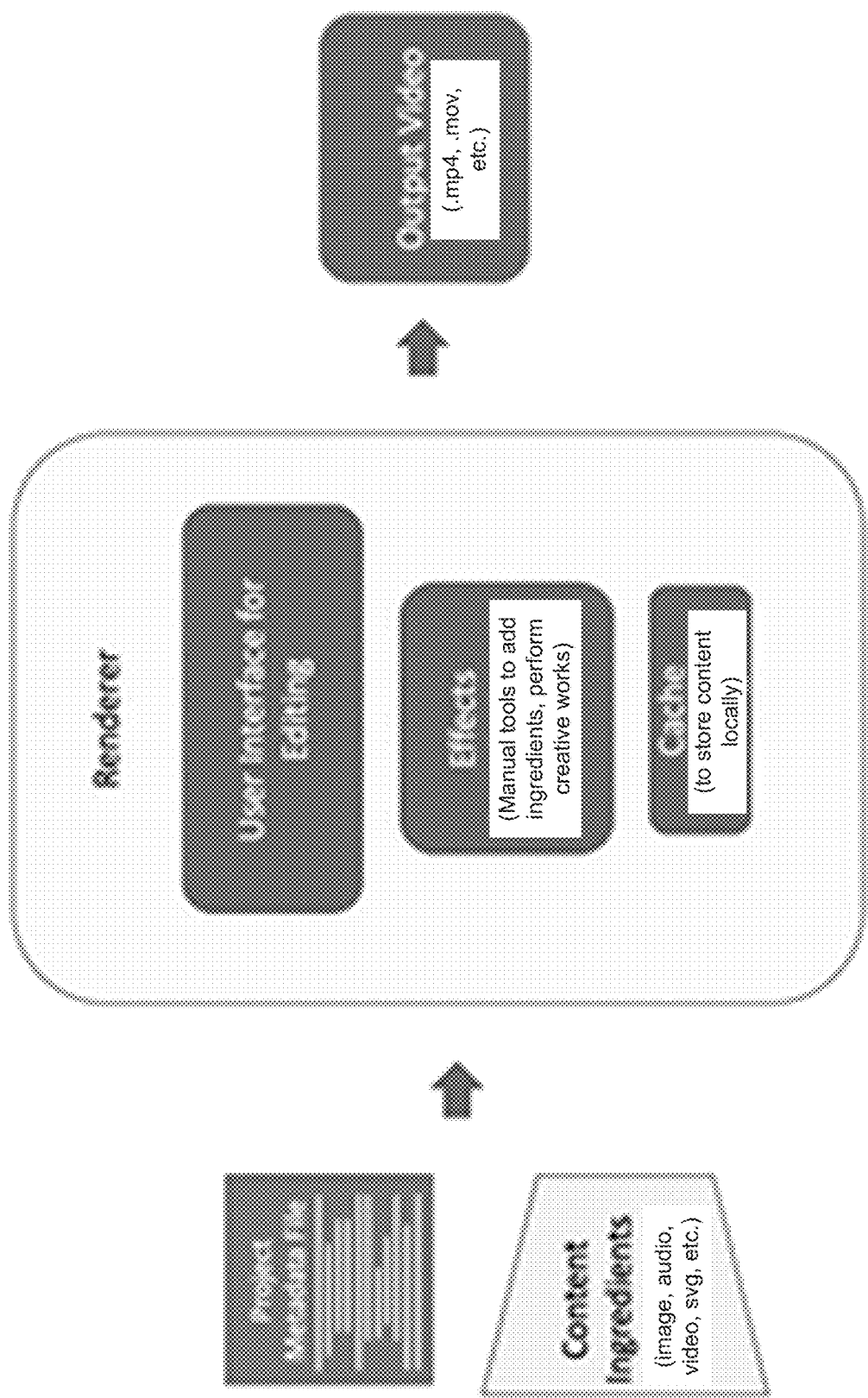
FIG. 6 is a block diagram illustrating how a project metadata file may be fed to a renderer to produce output video, according to an implementation.

The renderer interface may be on a mobile app, a desktop application, or a web-based application. When a creator has finished their composition, they may export the video, at which point the composition will be read to a standard video file format (.mp4, .mov, or other). (See FIG. 6)

A video typically contains a set of streams for audio-visual consumption. There is a stream of video frames to be displayed, an audio track (single or multi-channel), and potentially subtitles. Described herein is a method for associating frame-accurate metadata to a video file. The metadata can be generated in a variety of ways including, but not limited to, human annotation and computer-vision pipelines.

Existing video editing tools-'Project' files in existing video editing software describes in great detail a creator's particular project. Project files are single use and difficult to share.

Annotation/labeling tools-Labelbox & similar. Video files are decomposed into individual frames to annotate one or more objects. This annotation information is saved on a per-frame basis, but not on a per-video basis Real-time computer vision systems-Snap lenses. The approaches described herein are for existing video.

The process begins with an existing video clip (file). The video can be existing content of any type, aspect ratio, framerate, and bitrate. The video may be normalized to a certain framerate to ensure consistent processing.

Figure 7:
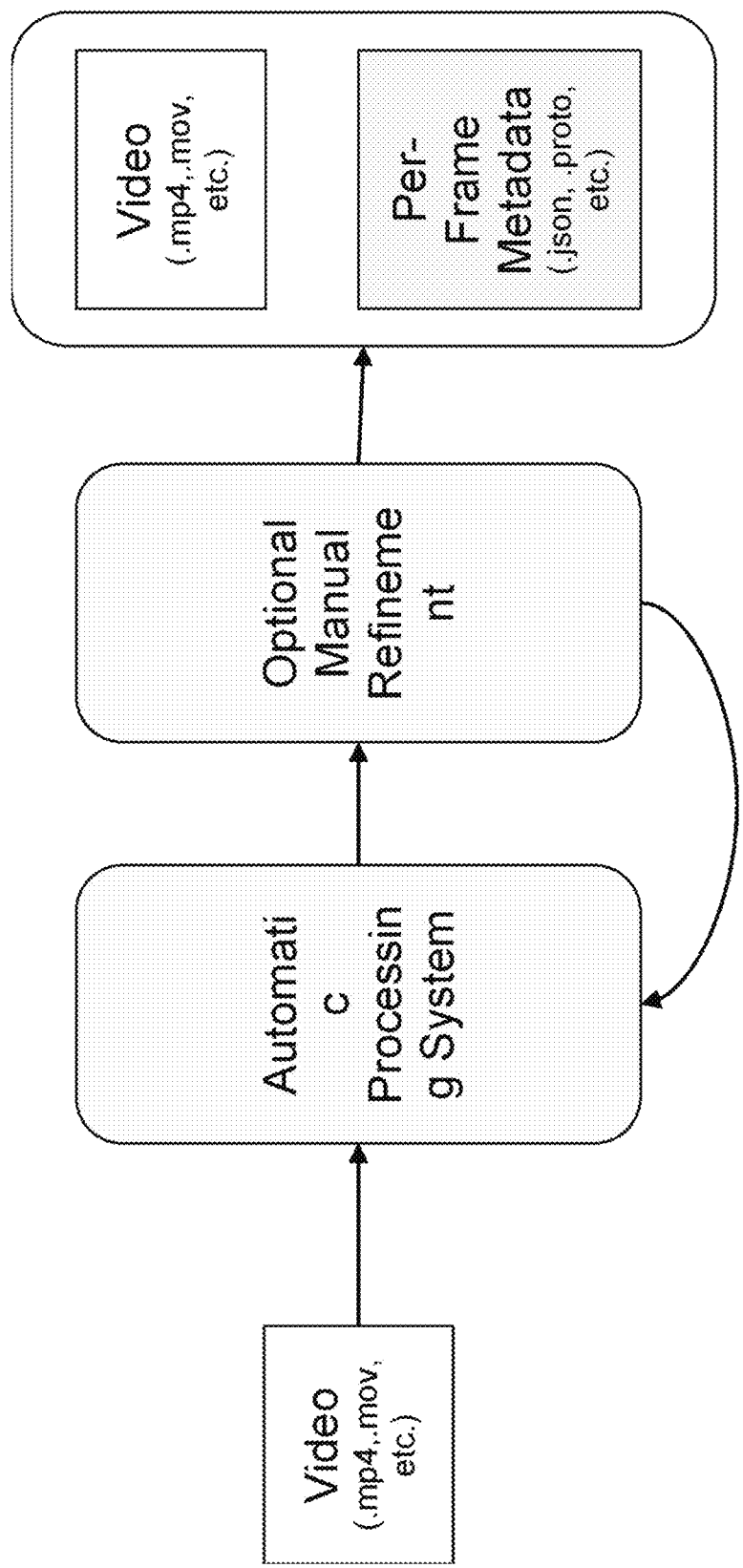
FIG. 7 is a block diagram illustrating how automatic processing and manual refinement may be used together to produce per-frame metadata, according to an implementation.

The video is ingested by the automatic processing system. This system includes computer vision pipelines that perform tasks such as detection, action recognition, tracking, and others. (See FIG. 7)

The main advantages are

Increases in ease and efficiency for video editing tools.

Re-usability & shareability of metadata by different people for different videos Allows building unified editing tools for both mobile and desktop Hardware Overview According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
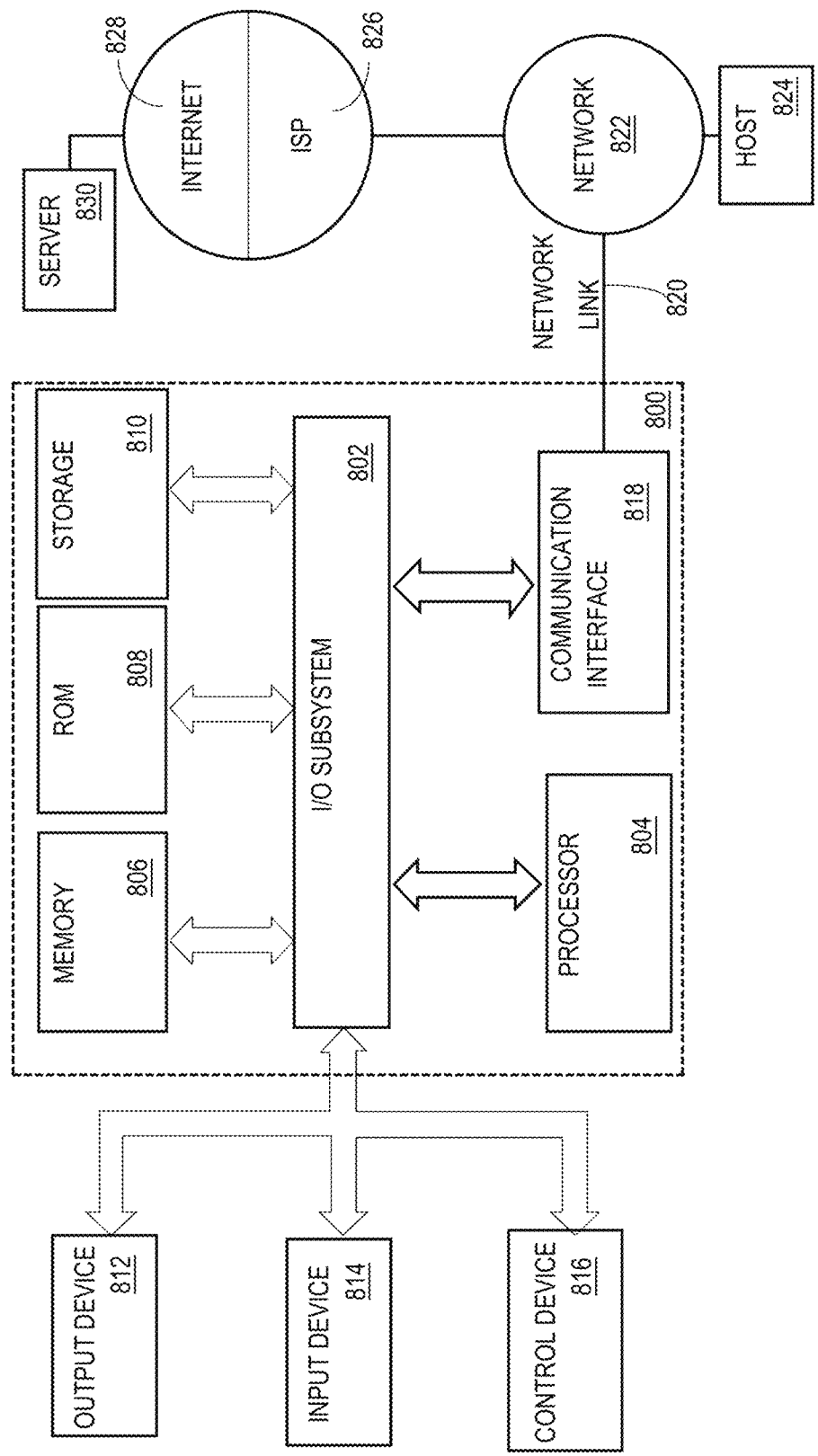
FIG. 8 is a block diagram of a computer system that may be used to implement the techniques described herein.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating, for a digital video project, a metadata file that includes:
   global information for the project including information associated with a rendered video file of the project;
   per-frame information that acts as a representation of continuous values throughout a video; and
   key-frame information which is a representation of discrete events throughout the video; and
   storing, separate from the rendered video file, the metadata file in a non-volatile storage media;
   wherein the method is performed by a metadata generation tool that is separate from a video editing tool; and
   wherein the method is performed by one or more computing devices.

2. The method of claim 1 wherein the per-frame information includes at least one of:
   point-wise location of specific objects; or
   polygons/rectangles of tracked objects.

3. The method of claim 1 wherein the key-frame information includes at least one of:
   information regarding scene changes;
   information regarding changes in emotion of a person; or
   information regarding changes in pose of a person.

4. The method of claim 1, wherein the global information for the project comprises at least one of:

framerate,
resolution,
media location,
thumbnail location, and
large metadata blob storage location.

5. The method of claim 1, wherein the per-frame information is generated, at least in part, from user input.

6. The method of claim 1, wherein the key-frame information is generated, at least in part, from user input.

7. The method of claim 1, wherein generating the metadata file does not include generating the rendered video file.

8. One or more non-transitory storage media storing instructions that, when executed by one or more computing devices, cause to perform the method, comprising:
   generating, for a digital video project, a metadata file that includes:
   global information for the project including information associated with a rendered video file for the project;
   per-frame information that acts as a representation of continuous values throughout a video; and
   key-frame information which is a representation of discrete events throughout the video; and
   storing, separate from the rendered video file, the metadata file in a non-volatile storage media;
   wherein the method is performed by a metadata generation tool that is separate from a video editing tool.

9. The one or more non-transitory storage media of claim 8, wherein the per-frame information includes at least one of:
   point-wise location of specific objects; or
   polygons/rectangles of tracked objects.

10. The one or more non-transitory storage media of claim 8,
    wherein the key-frame information includes at least one of:
    information regarding scene changes;
    information regarding changes in emotion of a person; or
    information regarding changes in pose of a person.

11. The one or more non-transitory storage media of claim 8, wherein the global information for the project comprises at least one of:
    framerate,
    resolution,
    media location,
    thumbnail location, and
    large metadata blob storage location.

12. The one or more non-transitory storage media of claim 8, wherein the per-frame information is generated, at least in part, from user input.

13. The one or more non-transitory storage media of claim 8, wherein the key-frame information is generated, at least in part, from user input.

14. The one or more non-transitory storage media of claim 8, wherein generating the metadata file does not include generating the rendered video file.

15. The method of claim 1, wherein generating, for the digital video project, the metadata file is based on an automatic processing of an original video file.

16. The method of claim 1, wherein generating, for the digital video project, the metadata file is based on manual processing using markup tools.

17. The one or more non-transitory storage media of claim 8, wherein generating, for the digital video project, the metadata file is based on an automatic processing of an original video file.

18. The one or more non-transitory storage media of claim 8, wherein generating, for the digital video project, the metadata file is based on manual processing using markup tools.

* * * * *